United States Patent [19]

Lindemann

[11] 4,115,306

[45] Sep. 19, 1978

[54] VINYL ESTER AQUEOUS ADHESIVE EMULSIONS INCLUDING ALLYL CARBAMATE

[75] Inventor: Martin K. Lindemann, Greenville, S.C.

[73] Assignee: Chas. S. Tanner Co., Greenville, S.C.

[21] Appl. No.: 853,993

[22] Filed: Nov. 25, 1977

[51] Int. Cl.$^2$ .............................................. C09J 3/12
[52] U.S. Cl. ........................ 260/17 A; 260/29.6 TA; 260/29.6 WB; 526/312
[58] Field of Search .... 260/17 A, 29.6 WB, 29.6 TA; 526/312

[56] References Cited

U.S. PATENT DOCUMENTS

| | | | |
|---|---|---|---|
| 3,165,498 | 1/1965 | Bissinger | 526/312 |
| 3,864,299 | 2/1975 | Kolb | 260/29.6 TA |
| 3,941,735 | 3/1976 | Lindemann | 260/29.6 WB |
| 4,001,160 | 1/1977 | Lindemann | 260/29.6 TA |

*Primary Examiner*—Eugene C. Rzucidlo
*Attorney, Agent, or Firm*—Dressler, Goldsmith, Clement, Gordon & Shore, Ltd.

[57] ABSTRACT

Aqueous adhesive emulsions based on aqueous emulsion copolymers of vinyl esters such as vinyl acetate, especially with ethylene, are provided with improved solvent insolubility and adhesion characteristics in the presence of hydroxy functional protective colloid which is present during the copolymerization, by the inclusion in the copolymer of a monoethylenic carbamate, especially allyl carbamate.

10 Claims, No Drawings

VINYL ESTER AQUEOUS ADHESIVE EMULSIONS INCLUDING ALLYL CARBAMATE

The present invention relates to vinyl ester aqueous emulsion adhesives which develop improved adhesion. Improved solvent insolubility on air dry is also contemplated. Copolymers of vinyl acetate with ethylene are of particular significance in this invention.

In the aqueous emulsion adhesives under consideration, the adhesive characteristic is supplied by the combination of an emulsion copolymer stabilized in the emulsion by an hydroxy functional protective colloid, especially polyvinyl alcohol or hydroxy ethyl cellulose, as the essential agents stabilizing the emulsion. Specifically, anionic and nonionic surfactants should not be present as the primary emulsifier, though small amounts of such agents for ancillary purpose, such as reducing surface tension, may be used.

Adhesives of the type under consideration are known, as illustrated for example in U.S. Pat. No. 3,708,388, in which I am a coinventor. However, the emulsion particles in these prior adhesives are unduly soluble in organic solvents, and the adhesion to substrates, such as polystyrene film, polyethylene film, polypropylene film, and the like, is poor, which limits the utility of the adhesive.

In U.S. Pat. No. 3,708,388 it was found when monomers providing a capacity to increase insolubility were present, instead of protective colloids, such as polyvinyl alcohol or hydroxy ethyl cellulose, that the adhesive quality was impaired. Further, if such monomers are present during the emulsion copolymerization together with the hydroxy functional protective colloid, then it is found that a reaction between the N-methylol group and the hydroxy group takes place during the polymerization. This produces excessive emulsion viscosities and, at times, produces a cheesy or gel-like emulsion which is useless.

In order to overcome this difficulty, I have previously included in the copolymer a small proportion of a monomer carrying an N-methylol group which had been etherified, and especially an etherified N-methylol allyl carbamate. These etherified monomers, for a variety of reasons, copolymerized without premature reaction with the hydroxy groups of the hydroxy functional protective colloid so that excessive viscosity in the aqueous emulsion is avoided at the same time that the curing potential is retained. This contribution is the subject of my U.S. Pat. No. 3,941,735 issued Mar. 2, 1976.

While the use of etherified N-methylol functional reactive monomers, as illustrated in U.S. Pat. No. 3,941,735, provides the important result of enabling a cure to be obtained, it does not permit one to improve adhesion without a cure.

In the present invention, it is found that the inclusion of allyl or methallyl carbamate in an amount of from 0.1-15%, preferably from 0.25-5% of the weight of ethylene-vinyl ester monomers being subjected to aqueous emulsion copolymerization in the presence of the hydroxy functional protective colloid, provides a useful copolymer emulsion which is stable. At the same time, and when the colloid-containing latex is used as an adhesive, improved adhesion to difficult surfaces of the types noted hereinbefore is obtained. It also appears that the carbamate reacts because there is an increase in the insolubility of the air dried adhesive film. Interestingly, on air drying, the emulsion copolymer-polyvinyl alcohol system in which the copolymer includes 1.0% of allyl carbamate, exhibits a marked increase in solvent insolubility, the solvent used for testing in this instance being trichloroethylene.

Curiously, the carbamate does not require blocking, but it nonetheless provides a more insoluble adhesive. The presence of the carbamate not only changes the solvent solubility of the system, but it improves adhesion to the substrates being laminated.

Referring more particularly to the hydroxy-functional protective colloid, these have been illustrated hereinbefore and are employed in an amount of about 0.05 to 10%, preferably from 0.1 to 5%, and most preferably from 0.5-2.5%, based on the total weight of the latex.

The vinyl ester which is used is preferably vinyl acetate, but all of the vinyl esters with saturated aliphatic monocarboxylic acids containing up to 18 carbon atoms are useful, vinyl propionate, vinyl stearate and vinyl versatate further illustrating the class under consideration. At least 40% of the copolymer, preferably at least 55% of the copolymer, will consist of vinyl ester, preferably vinyl acetate.

The vinyl ester may constitute the entire balance of the copolymer aside from the reactive monomer or monomers conferring curing capacity. Indeed, a copolymer containing in excess of 90% by weight of vinyl acetate with less than 10% by weight of the carbamate, with no other monomer, can be used. These copolymers provide excellent adhesives for wood, paper or textiles with the carbamate providing improved adhesion to difficult substrates such as polyolefin films and to polyesters.

On the other hand, it is frequently desired to include in the copolymer from 5-40%, preferably from 20-40% of ethylene, based on the weight of the copolymer. Ethylene is of significance in the development of the desired adhesive characteristic in many instances, e.g., for the lamination of plastic films, such as polyvinyl chloride, to paper, wood, or textiles. While the ethylene can be omitted or replaced with other internal plasticizers as noted below, this invention has especial applicability to vinyl ester-ethylene copolymers which themselves form good adhesives. These are also of especial value for coating carpet backing where polypropylene may be used in the fiber or in the backing.

If the ethylene component is to be replaced, another flexibilizing monomer is employed, such as an acrylate, maleate or fumarate ester with an alkanol containing from 2-18 carbon atoms. These monoethylenic esters are illustrated by n-butyl acrylate, isobutyl acrylate or dibutyl maleate or fumarate. These esters, if used, would be employed in an amount of 5% to about 60%, preferably from 20-50%, based on the weight of the copolymer.

As will be evident, monoethylenic monomers lacking functional groups reactive with hydroxy groups under the conditions of polymerization are broadly useful as a class, the flexibilizing monomers noted hereinbefore being preferred, especially ethylene. If increased hardness is desired, this can be obtained by using from 5-30% of monomers such as vinyl chloride or vinyl benzoate. Reactive monomers, other than the carbamate which may be present, are illustrated by monoethylenic alcohols such as allyl alcohol or 2-hydroxy ethyl acrylate or methacrylate, or the like, or monoethylenic carboxylic acids, such as acrylic, methacrylic, crotonic or itaconic acids, or the like. Sulphonic acids, or their salts, such as 2-sulpho ethyl methacrylate or sodium vinyl sulphonate are also useful.

The allyl or methallyl carbamate may include ether groups between the allyl group and the carbamate group. These ethers can be provided by reacting the allyl alcohol with an alkylene oxide, such as ethylene oxide, before converting the resulting alcohol to the carbamate.

These allyl carbamates have the formula:

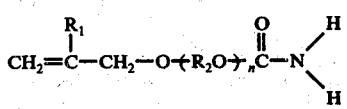

in which $R_1$ is hydrogen or methyl, $R_2$ is an alkylidene group containing from 2-4 carbon atoms, and $n$ is an integer from 0-10, preferably from 0-2.

Allyl carbamate is preferred and has the formula:

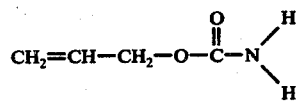

The emulsion copolymerization is a conventional one and the details thereof form no part of this invention except that the polymerization is carried out in an aqueous acidic environment having a pH of about 5.7 or lower, preferably in the range 4.5-5.8. This is conveniently done by adding a small amount of an acid which is preferably a mineral acid such as hydrochloric acid or phosphoric acid. Sodium benzoate or sodium bicarbonate can be added as a buffer. The final emulsion is also acidic, the acid present forming a salt with the $NH_2$ group of said carbamate. The pH is normally kept above 4.0 and while it may be about neutral, it is preferably below 6.5.

The invention is illustrated in the following example.

The following mixture is charged to a 17 gallon pressure autoclave equipped with agitator and temperature controls:

| Component | Grams |
|---|---|
| Water | 15,510 |
| Polyvinyl alcohol (Note 1) | 572 |
| Polyvinyl alcohol (Note 2) | 801 |

The above solution is premixed in a vessel equipped with jacket heating and agitation. The water is charged to the vessel at room temperature and the two polyvinyl alcohols are added as dry powders with agitation. The mixture is heated to 180° F. and held at this temperature for 2 hours, and the solution is allowed to cool and is then filtered through 4 ply cheesecloth. The resulting solution is then added to the pressure autoclave.

The following materials are then added in sequence to the autoclave:

| | Material | Grams |
|---|---|---|
| 1 | Allyl carbamate | 156 |
| 2 | Ferrous sulfate (1% aqueous solution) | 4 |
| 3 | Phosphoric acid | 10 |
| 4 | Vinyl acetate | 26,000 |

The autoclave is then purged to remove oxygen by pressurizing to 20 psig. with nitrogen and then evacuating to 2 psig. This nitrogen purge procedure is repeated once with nitrogen and then twice with ethylene. After the last purge, the autoclave is pressurized with ethylene to 600 psig. and this pressure of ethylene is maintained until about 95% of the vinyl acetate has been consumed in the polymerization reaction.

The polymerization reaction is initiated and maintained by keeping the contents of the autoclave at a temperature of 57° C. ±2° C. during the reaction period and by appropriate additions of an oxidant solution and a reductant solution. More particularly, the reaction mixture is maintained in a reducing state by addition of a reductant solution constituted by 300 grams of sodium formaldehyde sulfoxylate in 2,700 grams of water and the exothermic polymerization reaction is controlled by addition of an oxidant solution constituted by 300 grams of a 30% aqueous solution of hydrogen peroxide diluted with 2,940 grams of water.

The reaction mixture is sampled hourly for pH and total solids content, and whenever the batch solids exceeds 58%, it is diluted with water to 56%. When the unreacted vinyl acetate content drops to 5% of its original amount, the remaining oxidant solution (modified by the addition of 10 grams of t-butyl hydroperoxide) is added to permit the reaction to be completed. This is achieved as follows.

When the proportion of unreacted vinyl acetate has dropped to 2% of its original amount, the autoclave is vented to reduce the pressure to 130 psig., and the contents are then transferred to a pre-evacuated pressure vessel where the temperature is maintained until the vinyl acetate content is less than 0.3% of its original amount. The total solids content is then adjusted with water to 55-57% and 20% aqueous sodium benzoate is added to adjust the pH to 4-4.5. An emulsion having the following properties is obtained.

Solids content = 55.5%

Brookfield Viscosity (60 RPM — #4 spindle) = 2500 cps.

Insolubility in trichloroethylene (12 hr. air dry) = 67.2%

Instrinsic Viscosity (dimethyl formamide) = 1.39

$T_g$ (differential thermal calorimetry) 5° C.

In the absence of the allyl carbamate, the air dry insolubility would be about 40%, so the 67.2% insolubility obtained represents a marked improvement.

The result is an adhesive emulsion exhibiting superior adhesion, particularly to polypropylene surfaces.

I claim:

1. An aqueous adhesive emulsion which develops water resistance through cure, the water of said emulsion having emulsified therein an aqueous emulsion copolymer of monoethylenic monomers, at least 40 up to 99.5% of the copolymer being vinyl ester of a saturated aliphatic monocarboxylic acid having up to 18 carbon atoms and from 0.5-15% by weight of the copolymer of an allyl carbamate being the formula:

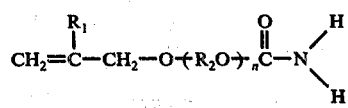

in which $R_1$ is hydrogen or methyl, and $R_2$ is an alkylidene group containing from 2-4 carbon atoms, and $n$ is an integer from 0-10, any balance of said copolymer consisting essentially of monoethylenic monomers copolymerizable with said vinyl ester and nonreactive with hydroxy during emulsion copolymerization, the monomers of said copolymer being emulsified during copolymerization by from 0.5 to 10% of an hydroxy functional protective colloid selected from the group consisting of polyvinyl alcohol and hydroxy ethyl cellulose and said adhesive emulsion being acidic to about neutral.

2. An aqueous adhesive emulsion as recited in claim 1 in which said copolymer includes from 5-40% of ethylene.

3. An aqueous adhesive emulsion as recited in claim 1 in which said copolymer includes from 20-40% of ethylene.

4. An aqueous adhesive emulsion as recited in claim 1 in which from 5-60% of said copolymer includes an acrylate, maleate or fumarate ester with an alkanol containing from 2-18 carbon atoms.

5. An aqueous adhesive emulsion as recited in claim 1 in which said carbamate is present in an amount of from 0.25-5%.

6. An aqueous adhesive emulsion as recited in claim 1 in which said hydroxy functional protective colloid is polyvinyl alcohol.

7. An aqueous adhesive emulsion as recited in claim 1 in which said copolymer includes at least 55% of vinyl acetate.

8. An aqueous adhesive emulsion as recited in claim 1 in which said carbamate is allyl carbamate.

9. An aqueous adhesive emulsion as recited in claim 1 in which the water of said emulsion includes an acid forming a salt with the $NH_2$ group of said carbamate.

10. An aqueous adhesive emulsion as recited in claim 9 in which said emulsion has a pH in the range of 4.0-6.5.

* * * * *

UNITED STATES PATENT AND TRADEMARK OFFICE
CERTIFICATE OF CORRECTION

PATENT NO. : 4,115,306
DATED : September 19, 1978
INVENTOR(S) : Martin K. Lindemann It is certified that error appears in the above-identified patent and that said Letters Patent are hereby corrected as shown below:

Col. 3, after line 50, add the following:

Note 1 - polyvinyl acetate 88% hydrolyzed (4% solids aqueous solution has a viscosity of 5 centipoise). The commercial product Gelvatol 20-30 may be used.

Note 2 - polyvinyl acetate 88% hydrolyzed (4% solids aqueous solution has a viscosity of 22 centipoise). The commercial product Gelvatol 20-30 may be used. The Gelvatol products are supplied by Shawinigan Resins Corp., Springfield, Mass.

Signed and Sealed this

Twenty-third Day of January 1979

[SEAL]

Attest:

RUTH C. MASON
Attesting Officer

DONALD W. BANNER
Commissioner of Patents and Trademarks